Jan. 23, 1923.
G. N. STEIGERWALD.
APPARATUS FOR WELDING RAILS.
FILED DEC. 16, 1921.
1,442,834
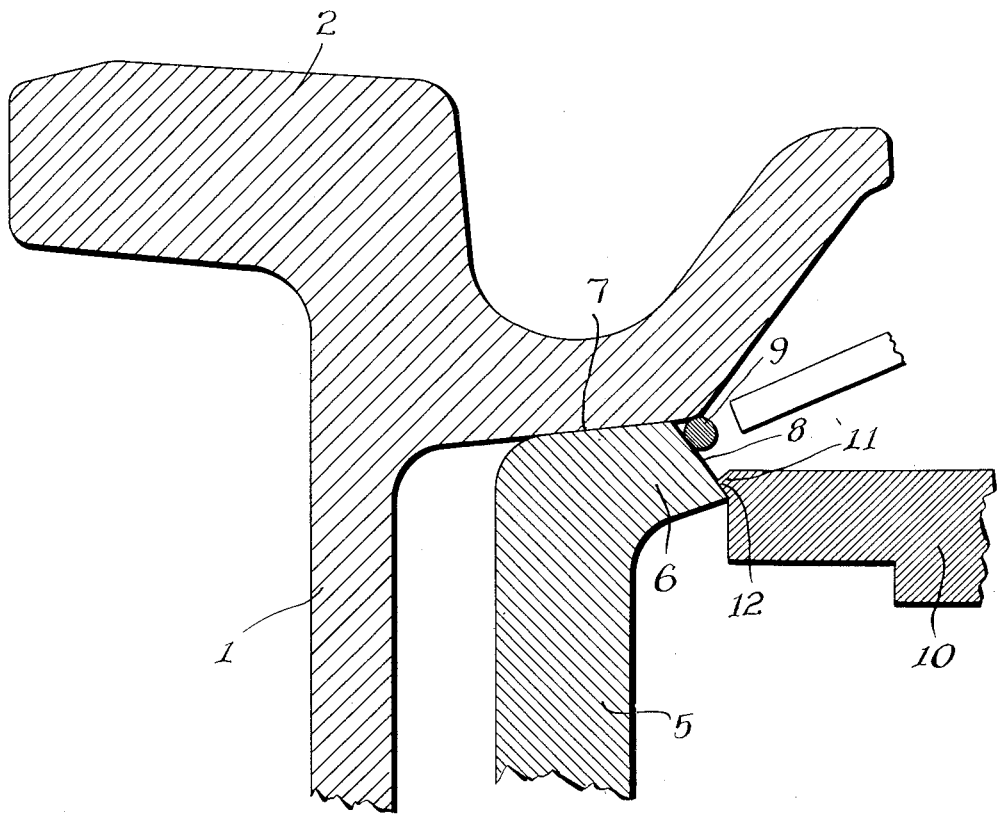

Patented Jan. 23, 1923.

1,442,834

UNITED STATES PATENT OFFICE.

GEORGE N. STEIGERWALD, OF HATBORO, PENNSYLVANIA, ASSIGNOR TO RAIL WELDING AND BONDING COMPANY, OF CLEVELAND, OHIO, A CORPORATION OF DELAWARE.

APPARATUS FOR WELDING RAILS.

Application filed December 16, 1921. Serial No. 522,789.

*To all whom it may concern:*

Be it known that I, GEORGE N. STEIGERWALD, a citizen of the United States, and resident of Hatboro, in the county of Montgomery and State of Pennsylvania, have invented certain new and useful Improvements in Apparatus for Welding Rails, of which the following is a specification.

This invention relates to an improved process and apparatus for welding rails by the carbon arc process by which the welding flame of the arc and the resulting welded joint produced by the fusion of the welding rod are more definitely located and advantageously positioned between the fishing angle of the fish plate and the adjacent rail flange. The defining bar may for this purpose be given a special shape so that it is formed with one or more aligning lips or projections so as to fit into this angle and preferably form a molding face some distance from the free edge of the flange of the fish plate and preferably in fairly close contact therewith. Also it is possible quickly and effectively to weld the rails with a sharper beveled supporting face on the fish plate and in some cases the beveled face may approach or approximate a vertical surface.

The accompanying somewhat diagrammatic drawings show in cross-section an illustrative form of apparatus for carrying out this new process.

The rail which may be of any desired form and cross section is shown as comprising the web 1 and head 2, so that one or more fish plates 5, which may have the flange 6, are bolted or secured in position in cooperation with the rail. The fish plate is beveled to contact or fish with the rail head as at 7, and the flange is also beveled to form a welding or supporting face as at 8, so that the more or less beveled or supporting faces form a somewhat acute angle with the adjacent surfaces of the rail. The welding rod 9 of special composition is, of course, supported in position during the welding and the electrode brought into action and fed along the joint so as to fuse this welding rod and form a weld in connection with the adjacent faces of the rail and fishing angle. The defining bar 10 of copper or similar material is in this case formed with a special projecting portion such as the aligning lip 11 which is adapted to cooperate with the free edge of the welding angle and thus position the molding face or dam edge 12 of the defining bar so that it projects considerably over the beveled supporting or welding face.

The shape of this projecting aligning lip of the defining bar may vary somewhat in accordance with the particular shape and size of the welding angle of the fish plate and the shape of the free or dam edge of this projecting aligning lip may vary and be more or less sharp, although the angular and somewhat downwardly inclined dam face 11 has proved a very desirable form of construction.

In carrying out this process the intense heating flame of the arc is more definitely localized with such a form of defining bar, since the bar is brought up more nearly into the joint between the rail flange and the beveled face of the fish plate and the flame of the arc is under more perfect control. Also the small quantity of metal forming the projecting lip of the defining bar radiates the heat with sufficient rapidity to prevent the chilling of the metal which might occur if a relatively large body of metal were used, and a more ductile weld is obtained than would be possible if the metal were immediately chilled. The annular projecting lip aligns the bar exactly with reference to the joint and fits closely over and supporting or welding face of the fish plate and, therefore, any molten metal which may flow away from the joint and down the welding face is congealed at a point appreciably above the free edge of the welding angle. The chilling effect of the bar upon the metal which flows down the welding angle does not affect injuriously the character of the welded metal, since it is an appreciable distance from the joint but, on the contrary, tends to assist the edge of the defining bar in forming a dam to hold back any additional metal which may tend to flow from the crater formed by the arc.

Having described this invention in connection with illustrative forms, parts, proportions, materials, conditions and orders of steps to the details of which disclosure the invention is not, of course, to be limited, what is desired claimed as new and what is desired to be secured by Letters Patent is set forth in the appended claims.

What I claim is:

1. The apparatus for the carbon arc welding of rail joints which comprises a defining bar adapted to cooperate with the beveled supporting face of the fish plate and formed with an angular projecting aligning lip to fit closely over the supporting face of the fish plate and having a vertically inclined molding face adapted to direct any molten metal toward said supporting face to promote the initial congealing thereof at points above the free edge of the welding angle and direct the welding flame of the arc into the angular space between the rail flange and the fish plate.

2. In apparatus for the carbon arc welding of rail joints, a defining bar adapted to cooperate with the fishing angle of the fish plate and formed with an angular projecting aligning lip to fit closely over the supporting face of the fish plate and having a vertically inclined chilling molding face adapted to direct any molten metal toward said supporting face to promote the initial congealing thereof at points above the free edge of the fish plate flange and to direct the heating flame of the arc into the angular space between the rail flange and the fish plate.

3. In apparatus for the carbon arc welding of rail joints, a defining bar adapted to cooperate with the fishing angle of the fish plate and formed with an angular projecting aligning lip to fit over the supporting face of the fish plate and having a chilling face adapted to direct any molten metal toward said supporting face to promote the initial congealing thereof at points above the free edge of the fish plate flange and to direct the heating flame of the arc into the angular space between the rail flange and the fish plate.

4. In apparatus for the carbon arc welding of rail joints, a defining bar adapted to cooperate with the fishing angle of the fish plate and formed with a projecting aligning lip to extend over the supporting face of the fish plate and localize and direct the heating action of the arc into the angular space between the rail flange and the fishing angle.

5. The process of welding rail joints by the carbon arc method which comprises applying to the beveled supporting face of the fish plate a defining bar having a projecting portion extending along the face of the fish plate and in substantial contact therewith and moving the arc electrode along the joint to melt the welding rod and effect the welding union thereof with the rail flange and with the supporting face of the fishing angle at a point substantially above its free edge and in contact with the increased body of metal of the fish plate adjacent its point of contact with the rail flange.

6. The process of welding rail joints by the carbon arc method which comprises applying to the supporting face of the fish plate a defining bar having a projecting lip extending along the face of the fish plate and moving the arc electrode along the joint to melt the welding rod and effect the welding union thereof with the rail flange and with the supporting face of the fishing angle at a point substantially above its free edge.

Signed at Hatboro, in the county of Montgomery and State of Pennsylvania, this 9th day of December A. D. 1921.

GEORGE N. STEIGERWALD.